Dec. 8, 1964  O. W. WELLES  3,159,968
MOUNTING STRUCTURE FOR THRUST DEVICES
Filed May 1, 1961  2 Sheets-Sheet 1
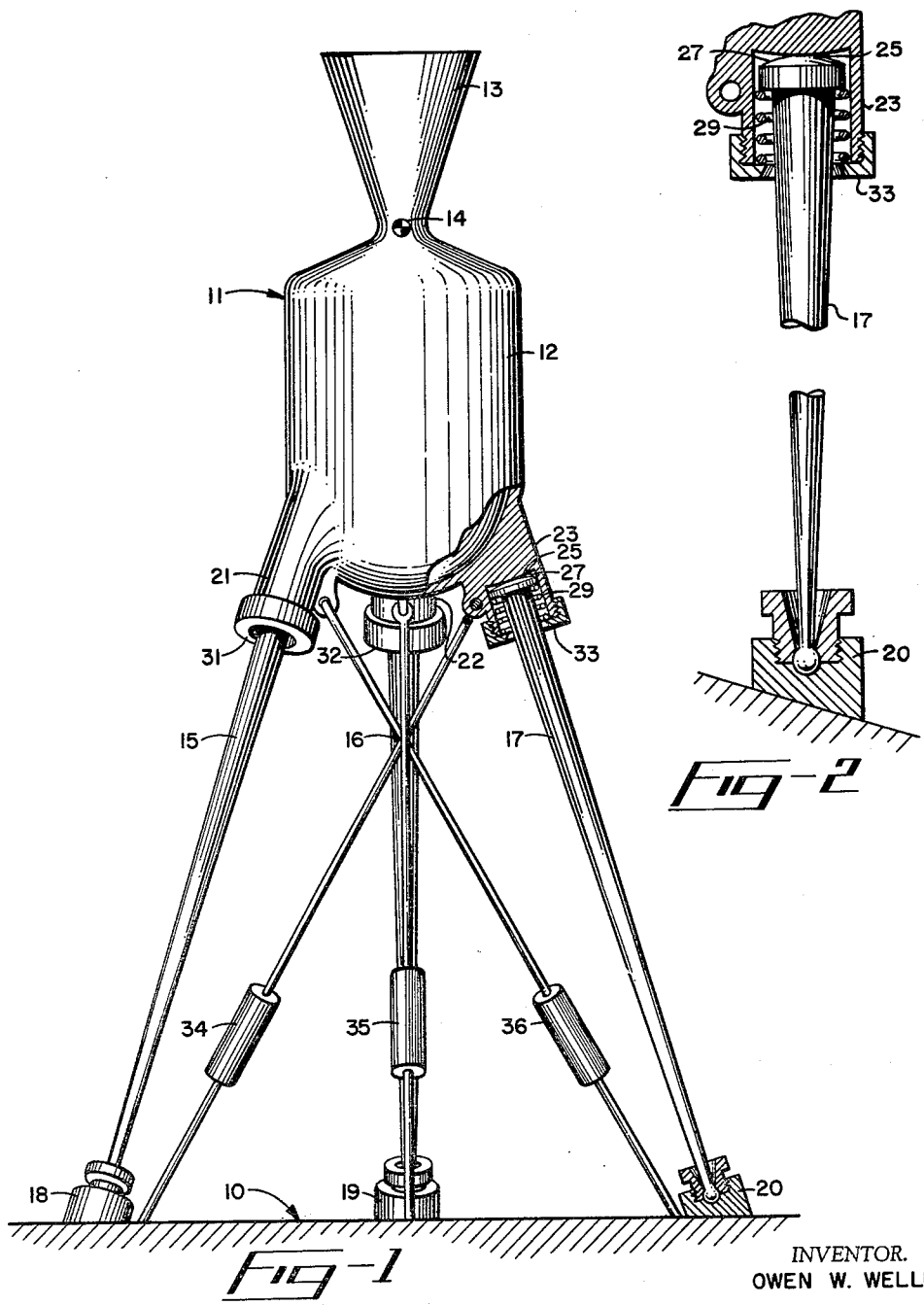
INVENTOR.
OWEN W. WELLES
BY D. Gordon Angus
ATTORNEY

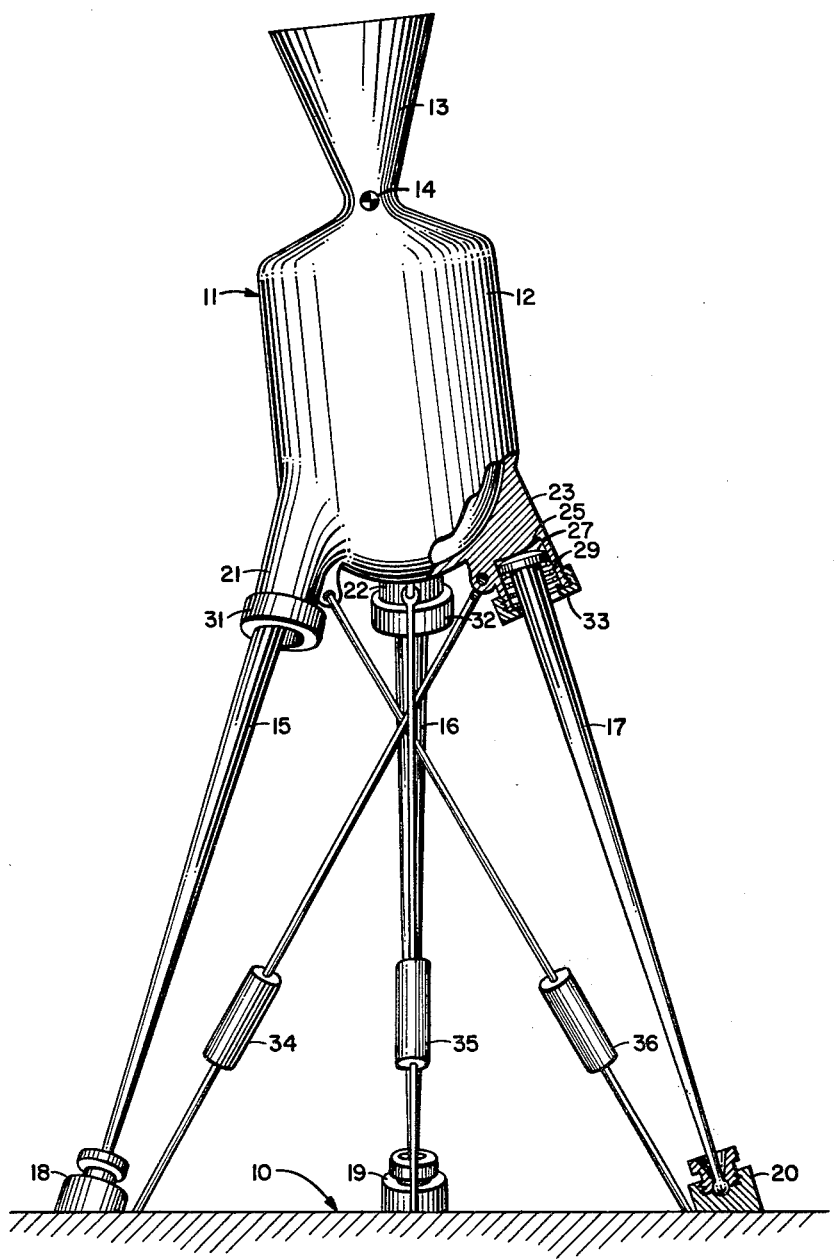

United States Patent Office 3,159,968
Patented Dec. 8, 1964

3,159,968
MOUNTING STRUCTURE FOR THRUST DEVICES
Owen W. Welles, Glendora, Calif., assignor to Aerojet-General Corporation, Azusa, Calif., a corporation of Ohio
Filed May 1, 1961, Ser. No. 106,728
8 Claims. (Cl. 60—35.55)

This invention relates to adjustable mountings of the link type for thrust devices such as jet and rocket motors, and particularly relates to mounting structure for rocket engines comprising a thrust chamber equipped with a fixed nozzle, said structure having a plurality of links connected between fixed structure and the thrust chamber and means to change the direction of thrust of the engine.

A difficulty experienced with an adjustable link mounting for thrust devices has been that when the direction of the thrust device was changed from normal the device was moved closer to the fixed structure, that is, in the same direction as the thrust, thus lessening the stability of the mounting.

It is the general object of the invention to provide an adjustable link mounting for thrust devices provided with means to prevent movement of the device toward the structure when the direction of the thrust is changed from normal and thus to maintain the stability of the mounting structure.

It is a further object of the invention to arrange cam means interposed between the fixed structure on which the thrust device is mounted and the device to prevent movement of the device toward the fixed structure when the angle of thrust of the device is changed from normal and preferably to move the device in the direction opposite to the direction of thrust.

Another object of the invention is to hold the links of the mounting in engagement with the thrust device while the latter is not in operation by resilient means which also apply a desirable frictional resistance to movement of the device.

Still further objects and features of the invention will become apparent from the following description and accompanying illustrative drawings.

In the accompanying drawings:
FIGURE 1 is a side elevation of the present invention illustrating an arrangement of the link-type mounting with certain parts being shown in section;
FIGURE 2 is an enlarged fragmentary view of FIGURE 1 showing details of the link-type mounting; and
FIGURE 3 is a side elevation of the present invention similar to FIGURE 1 with the thrust chamber canted at an angle to the fixed structure.

In FIGURE 1 the numeral 10 indicates structure such as the body of a missile constituting the fixed structure on which a rocket engine 11 is mounted. The engine 11 comprises a thrust chamber 12 equipped with a fixed nozzle 13, the center of gravity of the engine being indicated at 14.

The engine 11 is mounted on the fixed structure 10 by a plurality of links, three, 15, 16 and 17, being utilized. One end of each link is secured by ball and socket joints 18, 19, 20 equidistantly spaced from one another and from the longitudinal axis of the engine 11 in normal position. The opposite ends of the links 15, 16, 17 engage in sockets 21, 22, 23 projected from the wall of the thrust chamber 12, and bear against surfaces at the inner ends of the sockets and normal to the center lines of the links when the longitudinal axis of the engine is normal to the fixed structure.

The center lines of the links converge to the location of the center of gravity 14 of the mass of the thrust chamber and nozzle.

A cam-like arrangement between an abutting surface 25 in socket 23 and surfaces (not seen) in sockets 21 and 22 and the ends of the links 15, 16, 17 engaged in the sockets is required in order to prevent the engine 11 from moving toward the fixed structure consequent on rocking the engine in order to change the direction of thrust thereof from normal, which latter direction is at right angles to the fixed structure on which the engine is mounted.

The cam-like arrangement as seen in FIGURES 1 and 2 also includes a disc-like head 27 at the end of link 17, there being corresponding heads provided at the end (not seen) of the other links 15 and 16. The surface of the disc-like heads contacting the abutting surfaces at the inner ends of the sockets is given a convex form which for small angles of displacement may be elements of a sphere with a radius of the length of the links and will result in a small outward movement, that is, in the direction opposite to that of the thrust, when the direction of thrust is angularly changed.

It is to be noted that the cam action between the ends of the links and the surfaces against which they abut on the thrust chamber may be designed in various ways. For instance the surface at the inner end of the socket may be given a convex surface of greater radius than that on the end of the link, that described and shown in FIGURE 2 being given by way of example only. In any event any movement of the thrust chamber toward the fixed structure on which it is mounted is prevented when the angle of thrust is changed and preferably the thrust chamber is moved slightly in the opposite direction to the direction of the thrust.

In order to keep the links in firm engagement with the thrust chamber, whether the engine is in operation or not, a coil spring 29 as best shown in FIGURE 2, is positioned under pressure between the underside of the head 27 and a cap 33 closing the open end of the socket. The arrangement of the sockets 21 and 22 are, of course, identical with that described for socket 23. The coil springs are preferably also utilized to provide frictional damping of the heads of the links by using coil springs of slightly larger outside diameter than the inside diameter of the sockets before being forced into position in the sockets. This feature is illustrated by the contact of the coils with the socket wall.

Any suitable means may be utilized to effect angular adjustment of the thrust axis of the engine by rocking it on the links. Means are diagrammatically shown by way of example comprising hydraulic cylinders 34, 35, 36 effective to vary the angular position of the engine thrust chamber and nozzle. The action of the hydraulic cylinders may be controlled by pressure fluid directed into the cylinders through hydraulic lines and control valves as well understood in the art of hydromechanical controls for which reason such means are not shown in the drawings.

The operation of the invention as described is as follows:

When the thrust device, shown diagrammatically as a rocket engine, is inoperative, it is assumed that the longitudinal axis of the device extends normal to the fixed structure on which it is mounted and is held in this position by the coil springs in the sockets holding the link heads against the surfaces at the inner ends of the sockets.

When the thrust device is set into operation, the thrust developed will be passed directly through the links equally to the fixed structure. When the direction of thrust is adjusted from normal to an angle to the normal, as illustrated in FIGURE 3, in order to change the direction of the missile, the abutting surfaces at the inner ends of the sockets 21, 22, 23 will rock on the spherical cam surfaces on the heads of the links.

The cam surfaces are designed so that the resultant movement of the device is prevented from being slightly toward the fixed structure, that is, the direction of the thrust of the device.

A preferred embodiment of the invention has been described and illustrated by way of example but not as limitative of the scope of the invention, since various modifications may be made in the described embodiment by those skilled in the art without departing from the scope of the invention as defined by the appended claims.

What is claimed is:

1. Link mounting structure for thrust devices such as rocket motors rockable on the mounting structure to adjust the direction of the thrust comprising: a plurality of spaced links rockably connected between fixed structure and said device, cam means through which said links are connected between said fixed structure and said device, said cam means being effective to prevent movement of said device toward the fixed structure caused by rocking said device on said links for changing the direction of thrust of the device, and means for effecting rocking movement of said device on said links.

2. Link mounting structure as set forth in claim 1 wherein said plurality of spaced links connected between the fixed structure and the thrust device are inclined from the ends connected to the said fixed structure toward a common point located in said device.

3. Link mounting structure as set forth in claim 2 in which said point toward which the links are inclined is the center of gravity of the mass of the device.

4. Link mounting structure for thrust devices such as rocket motors rockable on the mounting structure to adjust the direction of thrust comprising: a plurality of spaced links, one end of said spaced links rockably connected to fixed structure at points equidistant from one another and from the normal axis of said device, cam means on the device, the opposite end of said spaced links abutting against said cam means, said cam means shaped so when the angular position of said thrust device is changed, said link mounting structure causes said thrust device to move in a direction opposite to the direction of the thrust exerted by said device, and means operable to effect an angular change in the axis of said thrust device.

5. Link mounting structure as set forth in claim 4 and in which said cam means on said device comprises: sockets provided on the exterior of the device and open ended toward the fixed structure, and a first cam element extending across the closed inner end of each socket; the opposite end of each of the links having a head extending into the socket corresponding thereto, a complementary cam element on the head of each link, and means maintaining said cam elements of the corresponding sockets and heads of the links in abutment at all times.

6. Link mounting structure as set forth in claim 5 in which said first cam element is formed as the surface of the closed inner end of each of the sockets, the heads of the links comprising disc-like members extending into the sockets, and each of the complementary cam elements being provided by a convex surface of the disc-like member abutting the first cam element corresponding thereto.

7. Link mounting structure as set forth in claim 6 and in which the means maintaining the said cam elements in abutment comprises: a closure for the open end of each socket, and a coil spring surrounding each link within each of the sockets and under compression between said closure and the disc-like member comprising the head of the link.

8. Link mounting structure as set forth in claim 6 and in which the means maintaining the said cam elements in abutment comprises: a closure for the open end of each socket, and a coil spring surrounding each link within each of the sockets and under compression between said closure and the disc-like member comprising the head of the link, the outside diameter of each of said coil springs being slightly greater than the inside diameter of the corresponding socket before being positioned in the socket, to thereby provide a frictional damping effect on movements of the disc-like members comprising the heads of the links.

References Cited in the file of this patent

UNITED STATES PATENTS

| 2,691,501 | 10/54 | Spencer | 248—168 |
| 2,802,635 | 8/57 | Engelbart | 248—163 |
| 2,938,459 | 5/60 | McGraw | 60—35.55 |

FOREIGN PATENTS 787,739   12/57   Great Britain.

SAMUEL LEVINE, *Primary Examiner*.